W. W. Willis,
Stump Elevator.
No. 569. Reissued June 22, 1858.
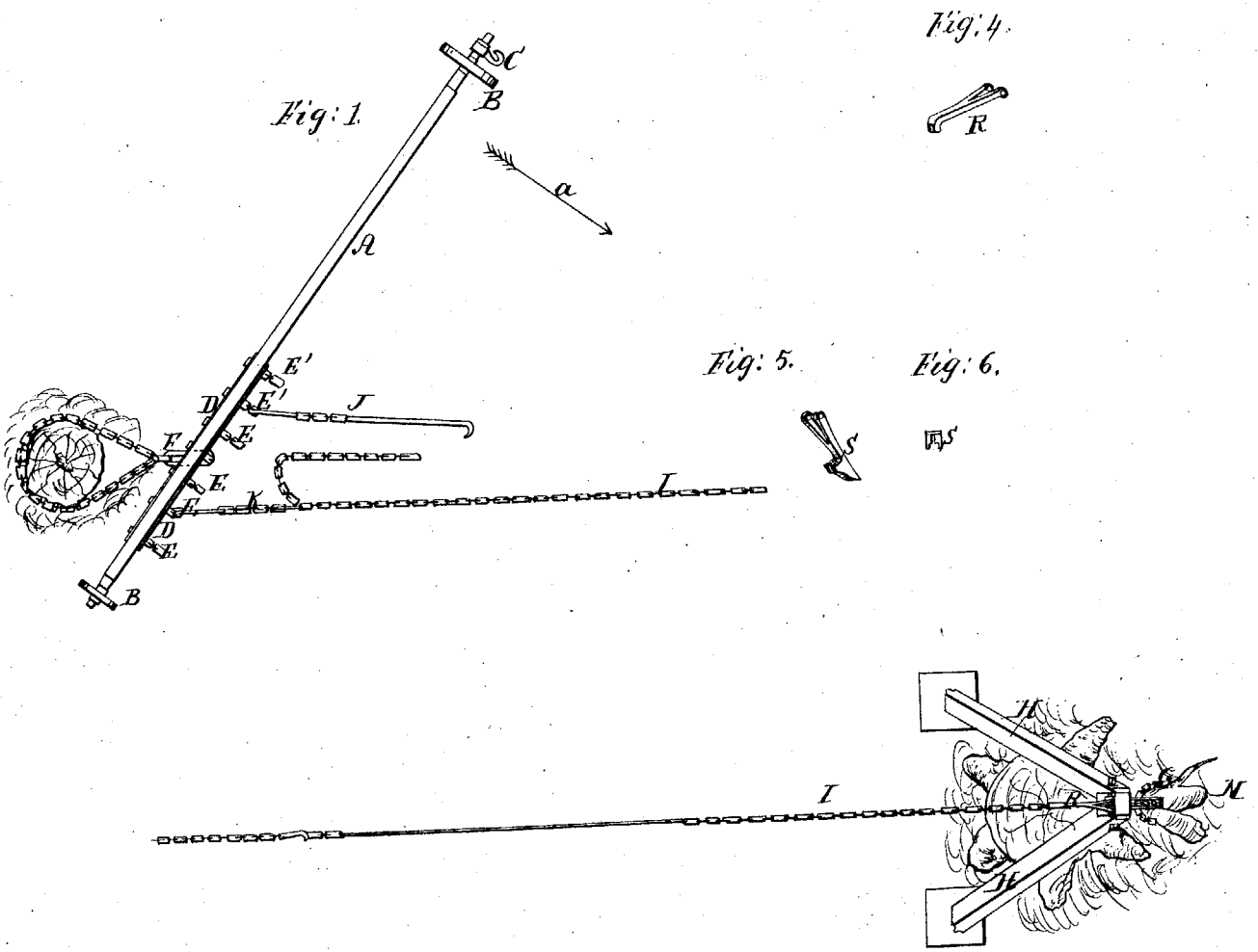
AM. PHOTO-LITHO. CO. N.Y. (OSBORNE'S PROCESS)

BEST AVAILABLE COPY

UNITED STATES PATENT OFFICE.

W. W. WILLIS, OF ORANGE, MASSACHUSETTS.

IMPROVEMENT IN MODES OF EXTRACTING STUMPS.

Specification forming part of Letters Patent No. 12,496, dated March 6, 1855; Reissue No. 569, dated June 22, 1858.

*To all whom it may concern:*

Be it known that I, WILLIAM W. WILLIS, of Orange, in the county of Franklin and State of Massachusetts, have invented a new and useful Improvement in Apparatus for Extracting Stumps, of which the following is a full, clear, and exact description, reference being had to the accompanying drawings, which make part of this specification, and in which—

Figure 1 represents a plan of the apparatus anchored to one stump and commencing to extract another. Fig. 2 represents a side view of the machine, the position of the parts being the same as in Fig. 1. Fig. 3 represents a side elevation of the machine with the stump raised on one side by the shears, and being drawn out by the aid of the tackle after the shears have ceased to operate efficiently as a toggle-lever. Fig. 4 represents the hook in front of the shears, which limits the action of the draft-chain to the shears, and prevents it from acting upon the pulley-blocks and tackle until after the shears have performed their office as a toggle-lever. Fig. 5 represents a view of the guard-hook on the rear of the shears to prevent the latter from falling down when the front hook is detached from the chain, and also to prevent the tackle from suddenly slacking and allowing the stump to return to the hole; and Fig. 6 represents an end view of the claws of the check or guard hook.

In the accompanying drawings, A represents a lever mounted upon wheels B, and from ten to fifty feet in length, according to the power to be exerted and the strength of the team by which it is operated. For drawing small stumps a lever of ten feet in length and a heavy yoke of oxen would be sufficient, while the largest stumps will require a larger lever or a stronger team. If the team is not increased, the length of the lever must be, as there are certain limits within which it will not answer to shorten the purchase, on account of the amount of slack necessary for hooking and unhooking the chain or links through which the purchase is applied to the stump in a manner hereinafter to be described.

On the outer or small end of the lever a hook, C, is placed for the team to be harnessed to. The inner end of this lever is strengthened by means of bars of iron D, and a row of hooks or links, E E′, are secured to the lever so as to project at one side, while a link, F, in the middle of this row projects at the other side. This link is the fulcrum on which the lever is made to turn, and a cable-chain, G, or other strong fastening, connects this link with a stump, tree, stake, grapple, or other object that will operate as an anchor and sustain the pull by which the stump to be extracted is drawn out of the ground.

If the force was applied in precisely the same way to an anchor-stump and to the one it was designed to withdraw, the latter would only be removed in case it was less firmly rooted in the ground than the other; but the force is not applied in the same way to both the stumps. The cable G, as shown in the drawings, is tied round the anchor-stump low down, while there is a pair of shears, H, standing over the stump to be drawn, to which the draft-chain is connected in such a manner that the pull upon the stump to be extracted is upward and toward the anchor-stump, and, while it is moved very slowly, the sum of the forces tending to withdraw it from the ground is at least ten times that which the anchor-stump has to resist.

The draft-chain I is connected to the links E E′ of the lever A, alternately, on opposite sides of the fulcrum-link F, as shown in Fig. 1, and when the lever has been turned in the direction of the arrow *a* until it is almost parallel with the draft-chain I, the link E is connected with chain by means of the link-rod J, when the motion of the lever is reversed and the draft-chain is taken up a distance nearly equal to the distance which the links J K are separated, less the slack which is necessary in order to hook the links. By repeating these movements of the lever and taking up the chain the stump will be drawn out.

The draft-chain is connected, as has been shown, by one end to the links J and K of the lever A, and its opposite end, after passing over a pulley, L, in the head M of a pair of shears, H, passes through block N, and is connected to a link, P, below the head of the shears. The shears are placed over the stump with their feet a little beyond the side of the stump in the direction in which it is be overturned, while the top of the shears overhangs the opposite side of the stump, its legs being inclined at an angle of about forty-five degrees. The hook on the lower side of the block N is now connected to one of the main roots of the stump by a chain, Q, engaged with the draft-chain I in front of the shears, while the check or guard hook S is engaged with the chain in the rear, the slacks of the chains being taken up before the hooks are applied. The lever is now put in operation, when the taking up of the chain will raise the shears, as shown in Fig. 2, lifting the stump with them. When the shears have been turned over toward the lever until they occupy the position shown in Fig. 3, they cease to act with any advantage upon the stump, and, as a heavy pull is still required in order to complete the extraction, it is usual to prop up the stump, slacken the chain, take a new purchase with the shears, and repeat the operation thus described. This causes a great deal of labor and occupies much time, to save both of which I have constructed the hook R, which, when the shears have reached the point shown in Fig. 3, I detach and turn back, as shown in the drawings, when the tackle comes into play, giving a sufficient increase of force to complete the pulling up of the stump without stopping to unhitch and take a new purchase. In this way the operation of extracting large stumps is greatly facilitated and the labor and expense diminished.

The hook B is made of iron, very strong, and jointed to the head of the shears, which also should be made of metal, and very strong, in order to sustain the pressure to which it is exposed, and to support the pulley L and hooks R S. The guard-hook S should also be made in the form represented, and be very strong.

The chains of the draft-hook R are of such construction that when they are engaged with the draft-chain the latter cannot move between them either backward or forward, and the shears, hook, and chain must therefore move together. The claws of the guard-hook are of such shape that the chain, by acting against the inclined rear side of them, will lift them up and move forward without obstruction, but will be caught by the front sides of the jaws and prevented from moving backward.

I do not propose to claim either the draft-hook, the shears, or the pulley by itself, as neither can of itself, nor can any two of them, perform the functions for which, after much thought and many experiments, I discovered that all three, acting in connection, were indispensable; neither do I propose to claim, broadly, the use of a lever adapted for being anchored so as to be vibrated horizontally to produce an alternating pull upon the stump to be extracted or lifted, as such a lever or its equivalent has been used before; but my application and arrangement of the links E E′ on each side of the fulcrum of the lever A, so as to be put in connection with the draft-chain I by means of the two hook and link rods J and K, as shown in Fig. 1, affords facilities for varying the power of the lever at the pleasure of the operator, during the process of extracting or lifting the stump, never attained before, and which are of the greatest importance, because it enables me to take up the slack of the chain I rapidly, on commencing operations, by connecting it with one of the links E or E′, farthest from the fulcrum, and afterward, with equal facility, to connect it alternately with those nearest the fulcrum, for first starting the stump or when the most power is required, and subsequently to again change the places of hitching to any links farther from the said fulcrum, as a diminution of power and an increase of speed may require.

Having thus described my improvement in stump-extractors, what I claim as my invention, and desire to secure by Letters Patent, is—

1. The combination of the draft-hook R, shears H, and pulley N, substantially in the manner and for the purpose herein set forth.

2. The application and arrangement of the links E E′, or their equivalents, in combination with the lever A, so that the said links may alternately be put in connection with the draft-chain I by means of the two link-hooks J and K, or their equivalents, substantially in the manner and for the purpose herein set forth and described.

In testimony whereof I have hereunto subscribed my name.

W. W. WILLIS.

Witnesses:

BENJ. MORRISON,
JNO. B. KENNEY.